United States Patent
Li et al.

(10) Patent No.: US 12,194,624 B2
(45) Date of Patent: Jan. 14, 2025

(54) EXOSUIT SUPPORT SYSTEMS AND METHODS

(71) Applicant: Georgia Tech Research Corporation, Atlanta, GA (US)

(72) Inventors: Jared Li, Atlanta, GA (US); Bharat Kanwar, Atlanta, GA (US); Theodore Johnson, Atlanta, GA (US); Jonathan Meditz, Atlanta, GA (US); Avery Yang, Atlanta, GA (US); Noel Csomay-Shanklin, Atlanta, GA (US); Joshua Bishop, Atlanta, GA (US); Dean Molinaro, Atlanta, GA (US); Aaron Young, Atlanta, GA (US)

(73) Assignee: Georgia Tech Research Corporation, Atlanta, GA (US)

( * ) Notice: Subject to any disclaimer, the term of this patent is extended or adjusted under 35 U.S.C. 154(b) by 608 days.

(21) Appl. No.: 17/604,271

(22) PCT Filed: Apr. 17, 2020

(86) PCT No.: PCT/US2020/028724
§ 371 (c)(1),
(2) Date: Oct. 15, 2021

(87) PCT Pub. No.: WO2020/226882
PCT Pub. Date: Nov. 12, 2020

(65) Prior Publication Data
US 2022/0193887 A1 Jun. 23, 2022

Related U.S. Application Data

(60) Provisional application No. 62/836,179, filed on Apr. 19, 2019.

(51) Int. Cl.
*B25J 9/00* (2006.01)
*A61H 1/02* (2006.01)

(52) U.S. Cl.
CPC .......... *B25J 9/0006* (2013.01); *A61H 1/0244* (2013.01); *A61H 1/0281* (2013.01);
(Continued)

(58) Field of Classification Search
CPC .... B25J 9/0006; A61H 1/0244; A61H 1/0281; A61H 2201/1215; A61H 2201/165;
(Continued)

(56) References Cited

U.S. PATENT DOCUMENTS 9,149,938 B1 * 10/2015 Summer ................ B25J 9/0006
9,351,900 B2    5/2016 Walsh et al.
(Continued)

FOREIGN PATENT DOCUMENTS

WO    2018/191777 A1    10/2018

OTHER PUBLICATIONS

International Search Report and Written Opinion from Application No. PCT/US2020/028724 dated Oct. 16, 2020.

*Primary Examiner* — Jason Holloway
*Assistant Examiner* — Madison B Emmett
(74) *Attorney, Agent, or Firm* — Troutman Pepper Hamilton Sanders LLP; Ryan A. Schneider; Dustin B. Weeks

(57) ABSTRACT

An exemplary embodiment of the present invention provides an exosuit support system, comprising first and second orthotic interfaces, first and second members, and first and second actuators. The first and second orthotic interfaces can be configured to attach to left and right legs of a user, respectively. The first member can comprise a first end connected to the first orthotic interface and a second end connected to a portion of the system configured to be positioned proximate a right shoulder of the user. The second member can comprise a first end connected to the second orthotic interface and a second end connected to a
(Continued)

portion of the system configured to be positioned proximate a left shoulder of the user. The first actuator can be configured to apply a first tension to the first member. The second actuator can be configured to apply a second tension to the second member.

19 Claims, 9 Drawing Sheets

(52) U.S. Cl.
CPC ............... *A61H 2201/1215* (2013.01); *A61H 2201/165* (2013.01); *A61H 2201/5007* (2013.01); *A61H 2201/5061* (2013.01); *A61H 2201/5084* (2013.01)

(58) Field of Classification Search
CPC .... A61H 2201/5007; A61H 2201/5061; A61H 2201/5084; A61H 2201/1472; A61H 2201/1614; A61H 2201/1623; A61H 2201/0173; A61H 2201/164; A61H 2201/5079; A61H 1/0292; A61H 1/0229; A61H 2201/5064; A61H 2201/5069; A61H 2230/605; A61H 1/00
See application file for complete search history.

(56) References Cited

U.S. PATENT DOCUMENTS

| | | | |
|---|---|---|---|
| 9,403,272 | B2 | 8/2016 | Kornbluh et al. |
| 10,434,030 | B2* | 10/2019 | Asbeck ............... A61F 5/01 |
| 2010/0256537 | A1* | 10/2010 | Menga ............... B25J 9/0006 |
| | | | 601/34 |
| 2014/0200715 | A1 | 7/2014 | Sugar et al. |
| 2014/0257560 | A1* | 9/2014 | Kamara ............... A61F 2/72 |
| | | | 700/250 |
| 2015/0209214 | A1* | 7/2015 | Herr ............... A61H 1/0266 |
| | | | 623/27 |
| 2016/0346156 | A1* | 12/2016 | Walsh ............... A61H 3/008 |
| 2017/0202724 | A1* | 7/2017 | De Rossi ............... A61H 3/00 |
| 2018/0056104 | A1* | 3/2018 | Cromie ............... A61H 3/00 |
| 2018/0116851 | A1* | 5/2018 | Lee ............... A61F 5/0102 |
| 2018/0153722 | A1* | 6/2018 | Cromie ............... B25J 9/0006 |
| 2019/0160651 | A1* | 5/2019 | Mahoney ............... A61F 2/68 |
| 2019/0224841 | A1* | 7/2019 | Ly ............... A61B 5/4504 |
| 2019/0283247 | A1* | 9/2019 | Chang ............... A61B 5/1121 |
| 2021/0007874 | A1* | 1/2021 | Galiana Bujanda .... A61F 5/028 |
| 2021/0370494 | A1* | 12/2021 | Hurley ............... B25J 9/0009 |

* cited by examiner

EXOSUIT SUPPORT SYSTEMS AND METHODS

CROSS-REFERENCE TO RELATED APPLICATIONS

This application claims the benefit of U.S. Provisional Application Ser. No. 62/836,179, filed on 19 Apr. 2019, which is incorporated herein by reference in its entirety as if fully set forth below.

FEDERALLY SPONSORED RESEARCH STATEMENT

This invention was made with government support under Grant No. 1830215, awarded by National Science Foundation. The government has certain rights in the invention.

TECHNICAL FIELD OF THE INVENTION

The various embodiments of the present disclosure relate generally to support systems and methods. More particularly, the various embodiments of the present invention are directed to exosuit support systems and methods.

BACKGROUND OF THE INVENTION

Occupations that require continuous manual labor introduce a greater chance for acute and chronic musculoskeletal disorders to occur in the lower back. Specifically, repetitive asymmetric and symmetric lifting and throwing of objects involved in occupations such as trash collecting, luggage handling, and package moving constantly contribute to compressive and shear loading in the lumbar spine. This compression of the lower spine via surrounding muscle groups leads to injury. These injuries ranked as the nation's top safety problem in the workplace according to OSHA's 1999 Fact Sheet No. 89-09. Constant pain felt by those who develop these injuries can significantly reduce quality of life and the ability to perform at work. By providing musculoskeletal assistance to manual labor workers, the rate of chronic and acute injuries experienced will decrease. This will allow workers to stay healthier, increasing quality of life and ability to work for longer periods of time. Companies using the device will also be able to save money through reduced work downtime and decreased health insurance expenditures due to workplace injury.

Products can help prevent lower back injuries by applying corrective forces to limit compression of the lumbar spine while allowing the user to move normally. Desirably, the device also operates in the numerous environments where manual labor takes place, such as warehouses, airports, and outdoors. For this purpose, exoskeletons and exosuits have been developed for use in manual labor that support the user during lifting tasks and relieve stress from the lower back. As discussed further below, most exoskeletons or exosuits on the market and in research today fall into either the category of rigid-active exoskeletons—using a non-compliant metal frame to provide active powered assistance—or flexible-passive exosuits—using pliable materials and passive mechanical assistance. There is, however, a gap in the market for a flexible-active exosuit which combines the best aspects of each design: high power output, lightweight, and a high degree of freedom.

Assistive exoskeletons and exosuits aim to tackle this issue using mechatronic systems to aid the user through orthotic interfaces. While many devices in the purview of this field apply assistive force to critical areas of the user, it is important to differentiate how the force is applied. Passive exosuits apply force to the user through purely passive mechanical systems, such as springs and dampers. Active exoskeletons, on the other hand, use motors and actuators to provide even greater assistance to the user. Currently, active exoskeletons use rigid mechanical structures, but introduce the disadvantages of increased weight and lower freedom of movement. Passive exosuits are generally more flexible, allowing for greater freedom of movement in the user at the cost of decreased assistive power. Desirably, an exoskeleton or exosuit for use in manual labor would bridge the gap between rigid active and flexible passive by autonomously providing high assistive force as well as increased freedom of movement. It is also desirable for the device to intelligently apply the forces to the body so that both mechanical and electrical energy are maximally conserved. In interfacing with the user, the device is desirably constructed in a way that it does not chafe or provide any uncomfortable friction against the attachment areas.

Providing assistive force to a user, however, introduces a number of concerns. For the force to actually provide assistance, desirably, the device will offload the high magnitude loads in the lumbar spine caused by bending with and without added weight. This requires high torque actuators, a sturdy frame for them to attach, and a large power supply to ensure a decent duration of operation. The method of assistance application is also considered, as assisting in different areas of the torso affects both the magnitude and direction of force. User comfort and safety can be implemented through comfortable interfaces with the body and means to prevent actuators over-driving and user injury. Once the device is fully constructed, its operation would desirably abide by IRB standards in order to conduct experiments and also comply with United States and international regulatory standards for powered exoskeletons at this time.

Therefore, for at least these reasons, there is a desire for improved exosuit support systems and methods. Various embodiments of the present invention address this desire.

BRIEF SUMMARY OF THE INVENTION

The present invention relates to exosuit support systems. An exemplary embodiment of the present invention provides an exosuit support system comprising a first orthotic interface, a second orthotic interface, a first member, a second member, a first actuator, and a second actuator. The first orthotic interface can be configured to attach to a left leg of a user. The second orthotic interface can be configured to attach to a right leg of a user. The first member can comprise a first end connected to the first orthotic interface and a second end connected to a portion of the system configured to be positioned proximate a right shoulder of the user. The second member can comprise a first end connected to the second orthotic interface and a second end connected to a portion of the system configured to be positioned proximate a left shoulder of the user. The first actuator can be configured to apply a first tension to the first member. The second actuator can be configured to apply a second tension to the second member.

In any of the embodiments disclosed herein, the system can further comprise a controller configured to control actuation of the first and second actuators.

In any of the embodiments disclosed herein, the first tension can be less than or greater than the second tension.

In any of the embodiments disclosed herein, the first tension can be equal to the second tension.

In any of the embodiments disclosed herein, the controller can be further configured to detect a magnitude of a load carried to the user and vary at least one of the first and second tensions in response to the magnitude.

In any of the embodiments disclosed herein, the controller can be further configured to actuate at least one of the first and second actuators to vary at least one of the first and second tensions during a movement by the user.

In any of the embodiments disclosed herein, the controller can be further configured to monitor movement of the user to determine times to start and stop application of the first and second tensions.

In any of the embodiments disclosed herein, the system can further comprise one or more sensors, and each of the one or more sensors can be configured to monitor a condition and generate an output to the controller indicative of the monitored condition.

In any of the embodiments disclosed herein, the one or more sensors can comprise at least one inertial measurement unit configured to measure an angular position, velocity, and acceleration of the user's torso.

In any of the embodiments disclosed herein, the one or more sensors can comprise at least one encoder configured to measure a rotation of the first and/or second actuators.

In any of the embodiments disclosed herein, the one or more sensors can comprise an electromyography (EMG) sensor configured to monitor signals from muscles of the user.

In any of the embodiments disclosed herein, the one or more sensors can comprise a sensor configured to monitor a magnitude the first tension and a second sensor configured to monitor a magnitude of the second tension, and wherein the controller can be configured to cause the first actuator to maintain the magnitude of the first tension when the magnitude of the first tension reaches a first level determined by the controller, and wherein the controller can be further configured to cause the second actuator to maintain the magnitude of the second tension when the magnitude of the second tension reaches a second level determined by the controller.

In any of the embodiments disclosed herein, the controller can be configured to cause the first and second actuators to vary the first and second tensions, respectively, based at least in part on a predetermined force profile, a biological profile, or a profile based on measured muscle activations from electromyography.

In any of the embodiments disclosed herein, the controller can be configured to operate in a zero impedance mode in which the first and second actuators follow the user during movement.

In any of the embodiments disclosed herein, the first orthotic interface can be configured to attach to a left thigh of the user and the second orthotic interface can be configured to attach to a right thigh of the user.

In any of the embodiments disclosed herein, the first member can comprise a first cable and the second member can comprise a second cable.

In any of the embodiments disclosed herein, the first actuator can comprise a first gear driven pulley and the second actuator can comprise a second gear driven pulley.

In any of the embodiments disclosed herein, at least one of the first member and the second member can comprise a mechanical hard stop to cease actuation of at least one of the first and second actuators.

In any of the embodiments disclosed herein, the system can further comprise a power supply configured to supply electrical power to the first actuator, second actuator, and controller.

In any of the embodiments disclosed herein, the first actuator can be positioned about the first orthotic interface and the second actuator can be positioned about the second orthotic interface.

Another embodiment of the present invention provides an exosuit support system comprising a first orthotic interface, a second orthotic interface, a first member, a second member, and a controller. The first orthotic interface can be configured to attach to a left thigh of a user. The first orthotic interface can comprise a pulley actuator. The second orthotic interface can be configured to attach to a right thigh of the user. The second orthotic interface can comprise a second pulley actuator. The first member can comprise a first end connected to the first actuator and a second end connected to a portion of the system configured to be positioned proximate a right shoulder of the user. The second member can comprise a first end connected to the second actuator and a second end connected to a portion of the system configured to be positioned proximate a left shoulder of the user. The controller can comprise a processor and memory. The memory can comprise instructions that, when executed by the processor, cause the system to actuate the first actuator to vary a first tension of the first member and actuate the second actuator to vary a second tension of the second member.

In any of the embodiments disclosed herein, the system can further comprise a plurality of sensors configured to monitor conditions of the user and generate outputs to the controller indicative of the monitored conditions. The controller can further comprise instructions that, when executed by the processor, cause the system to actuate the first and second actuators to vary the first and second tensions, respectively, based on the outputs received from the plurality of sensors.

These and other aspects of the present invention are described in the Detailed Description of the Invention below and the accompanying figures. Other aspects and features of embodiments of the present invention will become apparent to those of ordinary skill in the art upon reviewing the following description of specific, exemplary embodiments of the present invention in concert with the figures. While features of the present invention may be discussed relative to certain embodiments and figures, all embodiments of the present invention can include one or more of the features discussed herein. Further, while one or more embodiments may be discussed as having certain advantageous features, one or more of such features may also be used with the various embodiments of the invention discussed herein. In similar fashion, while exemplary embodiments may be discussed below as device, system, or method embodiments, it is to be understood that such exemplary embodiments can be implemented in various devices, systems, and methods of the present invention.

BRIEF DESCRIPTION OF THE DRAWINGS

The following Detailed Description of the Invention is better understood when read in conjunction with the appended drawings. For the purposes of illustration, there is shown in the drawings exemplary embodiments, but the subject matter is not limited to the specific elements and instrumentalities disclosed.

DETAILED DESCRIPTION OF THE INVENTION

To facilitate an understanding of the principles and features of the present invention, various illustrative embodiments are explained below. To simplify and clarify explanation, the invention is described below as applied to exosuit back support systems and methods. One skilled in the art will recognize, however, that the invention is not so limited. Instead, as those skilled in the art would understand, the various embodiments of the present invention also find application in other areas, including, but not limited to, exosuits for supporting other portions of a user's body, including by not limited to, arms, legs, hands, and the like.

The components, steps, and materials described hereinafter as making up various elements of the invention are intended to be illustrative and not restrictive. Many suitable components, steps, and materials that would perform the same or similar functions as the components, steps, and materials described herein are intended to be embraced within the scope of the invention. Such other components, steps, and materials not described herein can include, but are not limited to, similar components or steps that are developed after development of the invention.

Figure 1:
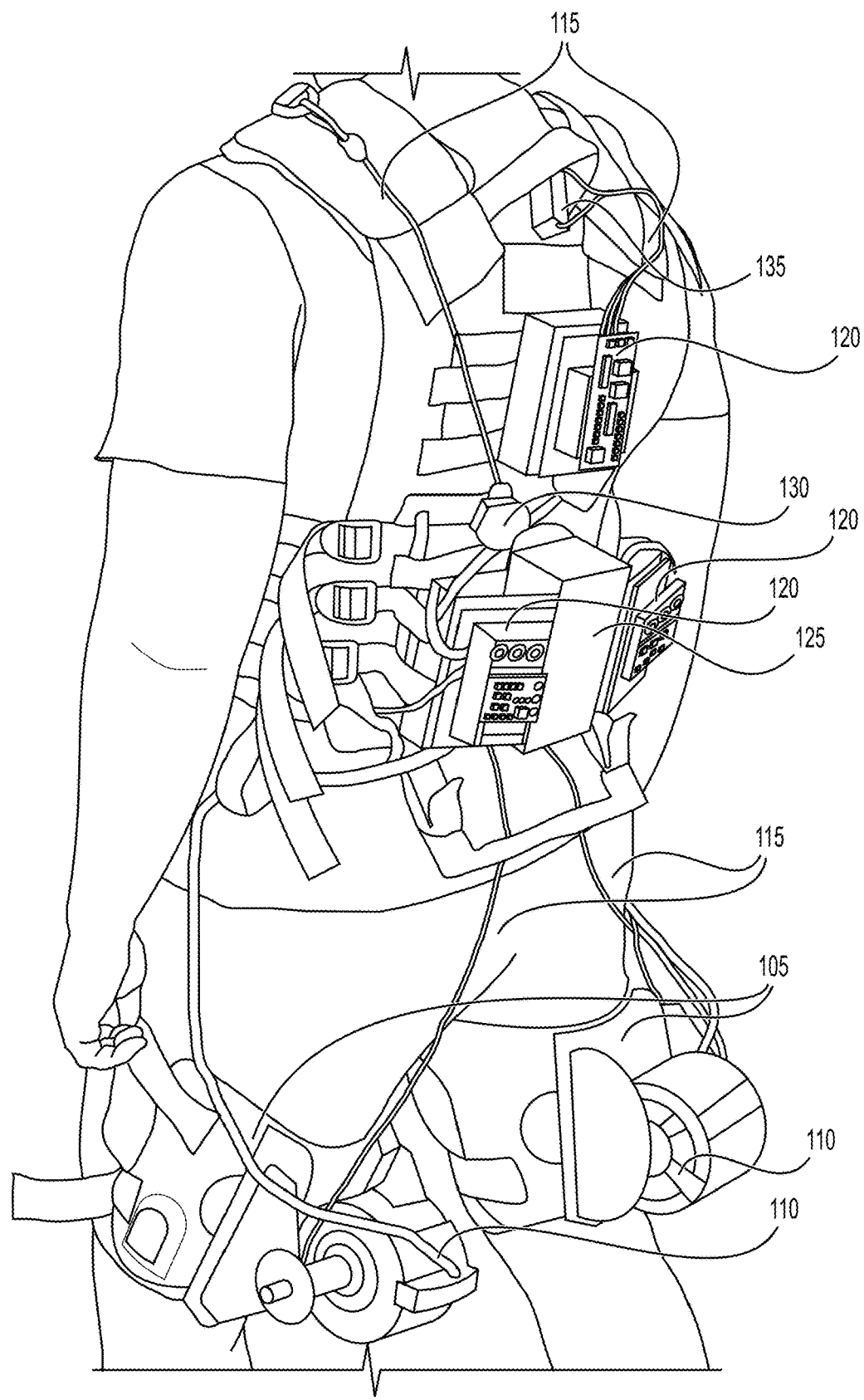
FIG. 1 illustrates an exosuit support system, in accordance with an exemplary embodiment of the present invention.

As shown in FIG. 1, an exemplary embodiment of the present invention provides an exosuit support system comprising a first orthotic interface 105, a second orthotic interface 105, a first member 115, a second member 115, a first actuator 110, and a second actuator 110. The first and second orthotic interfaces 105 can be configured to attach to opposing lower portions of the body of a user, e.g., legs. For example, as shown in FIG. 1, the first and second orthotic interfaces 105 can be configured to attach to the left and right thighs, respectively, of a user. The orthotic interfaces 105 can be made of many different materials in accordance with various embodiments, including, but not limited to, fabric, plastics, composites, carbon fiber, fiberglass, metals, polymers, and combinations thereof. The orthotic interfaces 105 can be configured to attach to a user many different ways in accordance with various embodiments, including, but not limited to, straps, buckles, Velcro, and the like. In some embodiments, the orthotic interfaces 105 can comprise an aperture into which a user can insert their leg to secure the interface to the user.

The first member 115 can comprise a first end connected to the first orthotic interface 105 and a second end connected to a portion of the system configured to be positioned proximate a right shoulder of the user. The second member 115 can comprise a first end connected to the second orthotic interface 105 and a second end connected to a portion of the system configured to be positioned proximate a left shoulder of the user. As used herein, proximate a right/left shoulder of a user refers to any area on the upper right/left quadrant of the user's torso, respectively. For example, in an exemplary embodiment, the exosuit can comprise a vest having connectors positioned proximate the right and left scapulas of a user when the vest is worn by a user where second ends of the members 115 can attach. The second ends of the members 115 can be attached to these connectors.

The first and second members 115 can be many different types of members known in the art for connecting two elements together, including, but not limited to, cables, straps, bands, and the like. As shown in FIG. 1, the first and second members 115 comprise cables. Additionally, the first and second members 115 can be made from many different materials, including, but not limited to, metals, fabrics, nylon, and the like.

The first ends of the members 115 can be connected to the orthotic interfaces 105 directly or indirectly via other elements. For example, in some embodiments, as shown in FIG. 1, the first ends of the first and second members 115 can be connected to the first and second orthotic interfaces 105, respectively, indirectly via the first and second actuators 110, respectively. Additionally, as discussed in more detail below, the members can also comprise one or more sensors 135 for measuring a tension of the members 115. Similarly, the second ends of the members 115 can be connected to the system directly or indirectly via other elements, e.g., sensors, etc.

The system can also comprise one or more actuators 110 for applying tension to the first and second members 115. By applying tension to the first and second members 115, force is exerted to the shoulder area of the user from the leg area, which limits or reduces compression in the lower back of the user. The actuators 110 can be many different actuators known in the art that can increase/decrease tension in the members 115. For example, as shown in FIG. 1, the actuators 110 can be pulley actuators driven by a gear system, such as a planetary gear system. Upon rotation of the pulley, tension can be increased or decreased in the members 115 to vary the assistive force provided to the user. Although the actuators 110 are shown in FIG. 1 as positioned proximate the orthotic interfaces 105, the invention is not so limited. Rather, the actuators 110 can be positioned at many locations about the exosuit, such that the actuators 110 are capable of varying the tensions on the first and second members 115. As shown in FIG. 1, the system can further comprise one or more mechanical hardstops 130, which can be positioned about the members, to prevent over application of force to the user by the actuators and members.

The system can also include a controller 120 configured to control actuation of the first and second actuators 110. The controller 120 can receive outputs generated by one or more sensors 135 positioned about the system. The sensors 135 can be many different sensors known in the art for monitoring conditions of the user and/or system. For example, system can comprise one or more inertial measurement units configured to measure an angular position, velocity, and/or acceleration of the user's torso. Additionally, or alternatively, the system can comprise one or more encoders configured to measure a rotation of the first and/or second actuators. Additionally or alternatively, the system can comprise one or more electromyography (EMG) sensors configured to monitor signals from muscles of the user. Based at least in part on inputs received from the various sensors, the controller 120 can be configured to monitor movement of the user to determine when to start and stop actuation of the first and second actuators. Additionally, the controller 120 can determine, based at least in part on inputs received from the one or more sensors, a magnitude of a load carried by the user and vary a magnitude of the tensions of the first and second members in response to that magnitude. In other words, the controller 120 can determine when to begin and end actuation to adjust for start and stop times and magnitude of the tensions on the members. The controller 120 can cause the actuators to adjust the tensions on the members such that the tensions are substantially equal (allowing for symmetrical movement) or different (allowing for asymmetrical movement). Additionally, the controller 120 can vary the tension in the members during a movement (e.g., a lift or throw). For example, the controller 120 can increase the tension in the first or second member as the user lifts an object. Similarly, the controller 120 may increase the tension in the first member and decrease the tension in the second member while the user throws an object.

As those skilled in the art would appreciate, the controller 120 can be many different controllers known in the art. The controller 120 can comprise one or more processors and one or more memories (e.g., non-transitory computer readable media). The one or more memories can comprise instructions that when executed by a processor, cause the processor to control the actuators as discussed herein. In some embodiments, the controller 120 can comprise one or more subcontrollers that work together to control various operations of the actuators. For example, as shown in FIG. 1, one or more subcontrollers can be located about a housing 125.

Exemplary Exosuit Support System

Figure 2A:
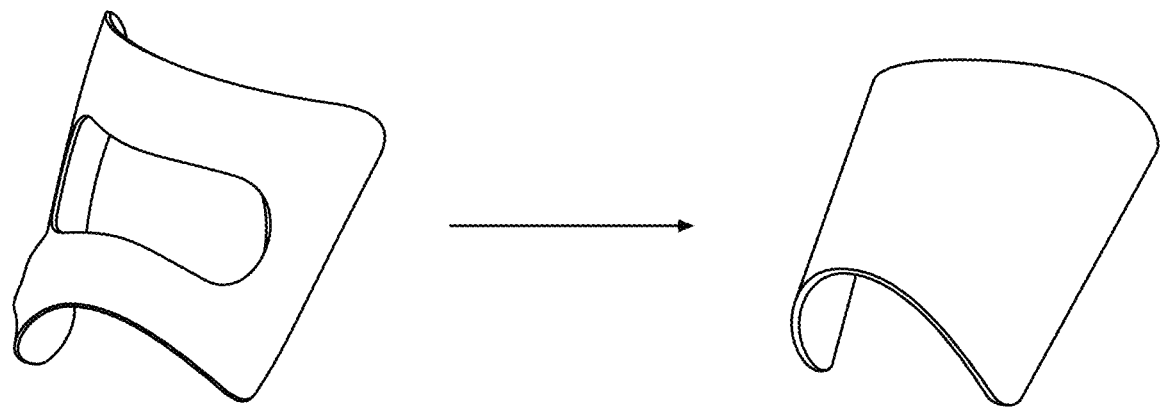
FIG. 2A provides an orthotic interface and FIG. 2B provides an attachment bracket for an orthotic interface, in accordance with an exemplary embodiment of the present invention.

An exemplary exosuit support system will now be described. The exemplary system is shown for illustration purposes only and should not be construed as limiting the scope of the invention.
Orthotic Interface The actuators can be attached to the user with an intermediary component to fasten onto the orthotic thigh interfaces. To facilitate attachment of an intermediate bracket, 3D scans of the interfaces were created using the FARO Arm. These scans were then decimated to 20 k polygons and imported into SolidWorks. As shown in FIG. 2A, a surface was derived from the orthotic scan, which allowed for an accurate profile off of which to build the bracket.

Figure 2B:
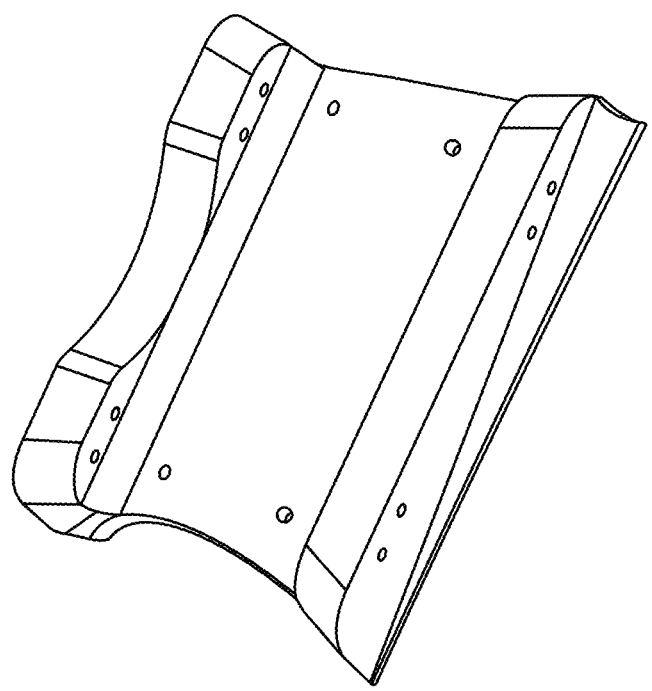

The derived surface was eventually modeled into the final part, which his shown in FIG. 2B. The bracket attaches to the orthotic interface through the 4 holes on the middle curved surface and to the actuators through the 8 holes on the bracket rails. This bracket can be 3D printed due to the difficulty of machining it out of aluminum or another light metal (those options are embodiments of the present invention).

Actuators

Figure 3A:
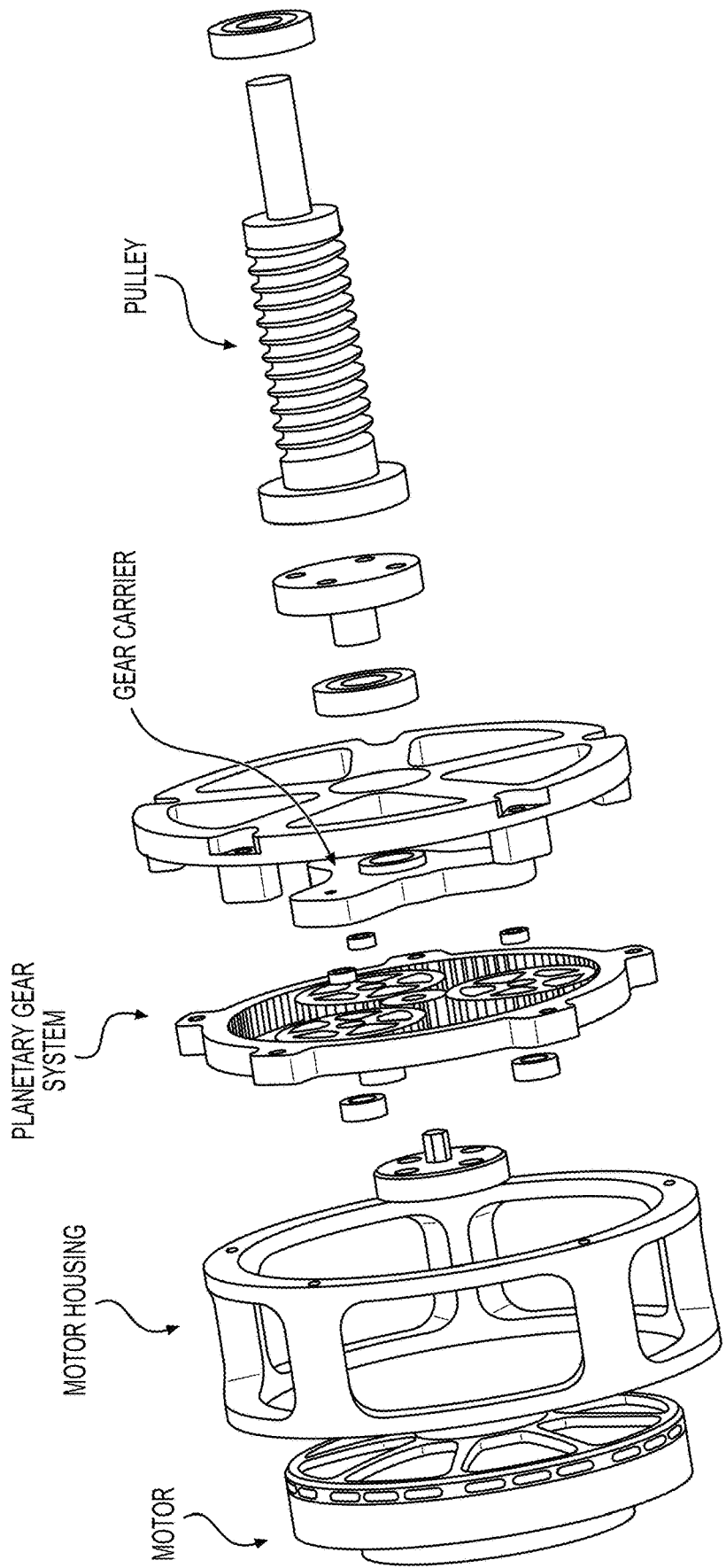
FIGS. 3A-C illustrate an exemplary gear-driven pulley actuator, in accordance with an exemplary embodiment of the present invention.
Figure 3B:
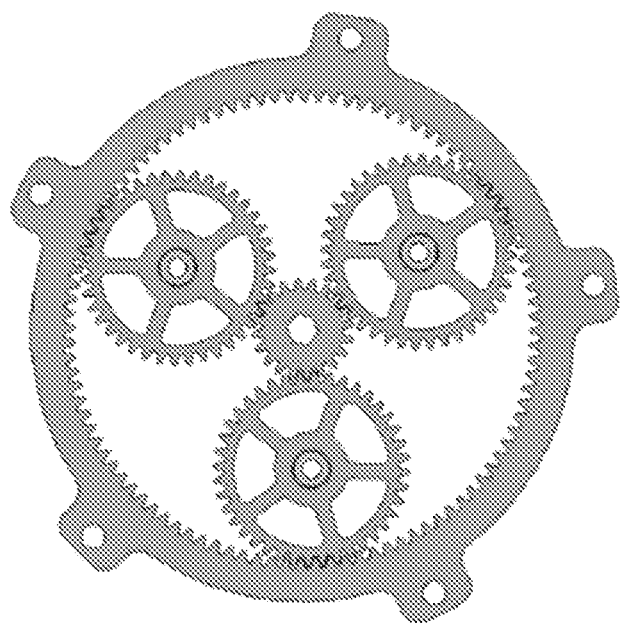
Figure 3C:
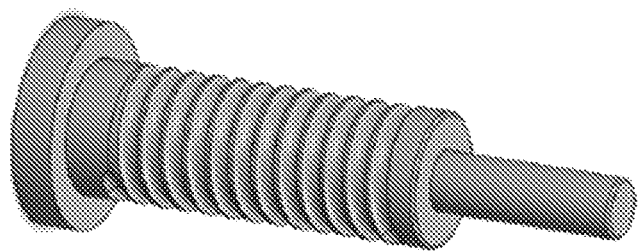

FIGS. 3A-C illustrate an exemplary gear-pulley drive actuator employed in various embodiments. As shown in FIG. 3A, the actuator can comprise a brushless outrunner motor, motor housing, planetary gear system, gear carrier, and pulley.

Figure 4:
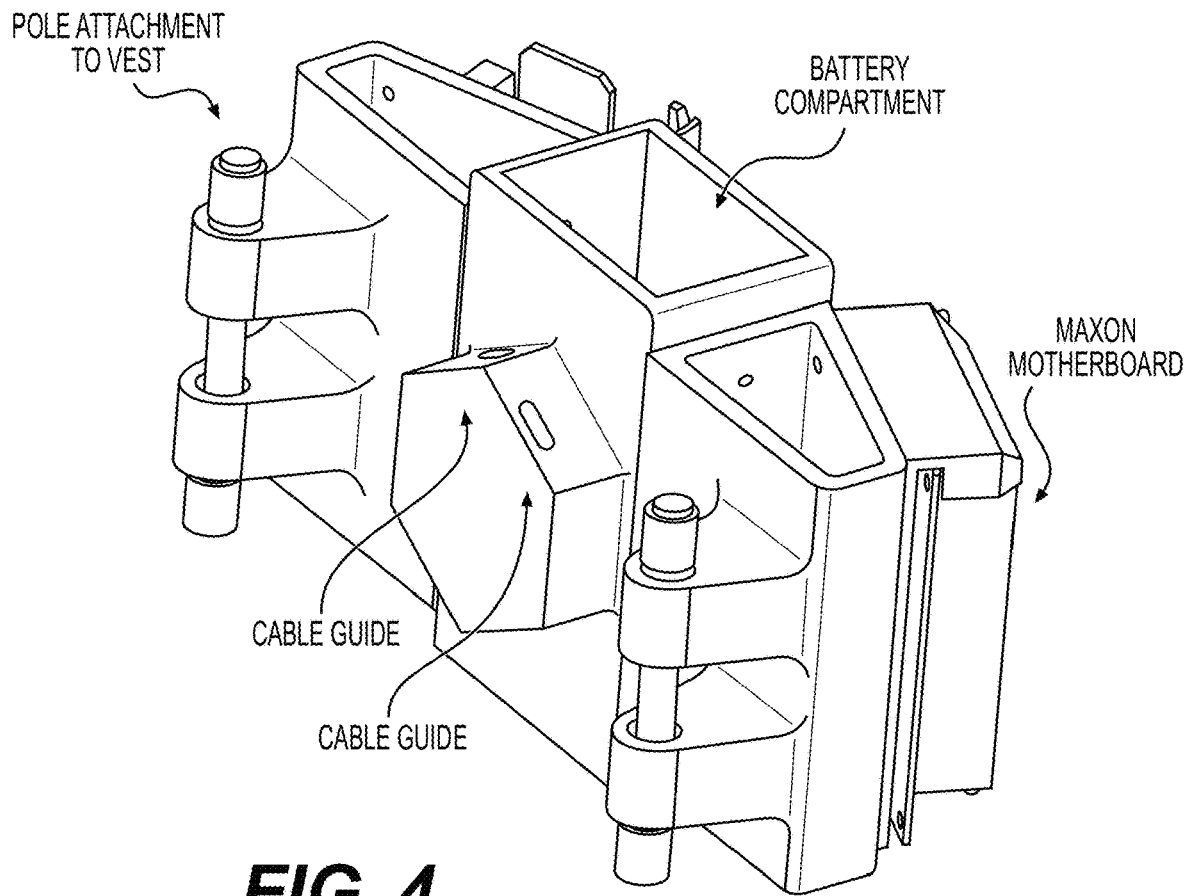
FIG. 4 illustrates an exemplary electronics and cable housing, in accordance with an exemplary embodiment of the present invention.
Figure 5:
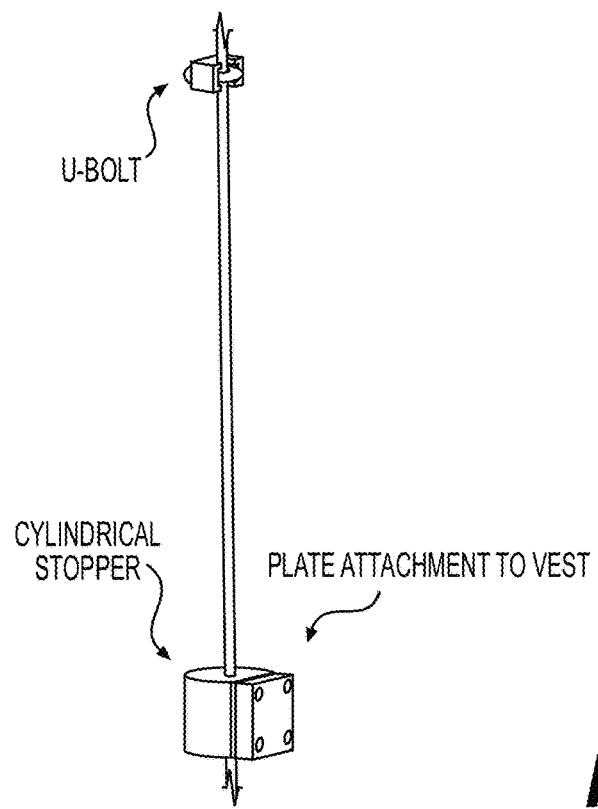
FIG. 5 illustrates a mechanical hardstop, in accordance with an exemplary embodiment of the present invention.
Figure 6A:
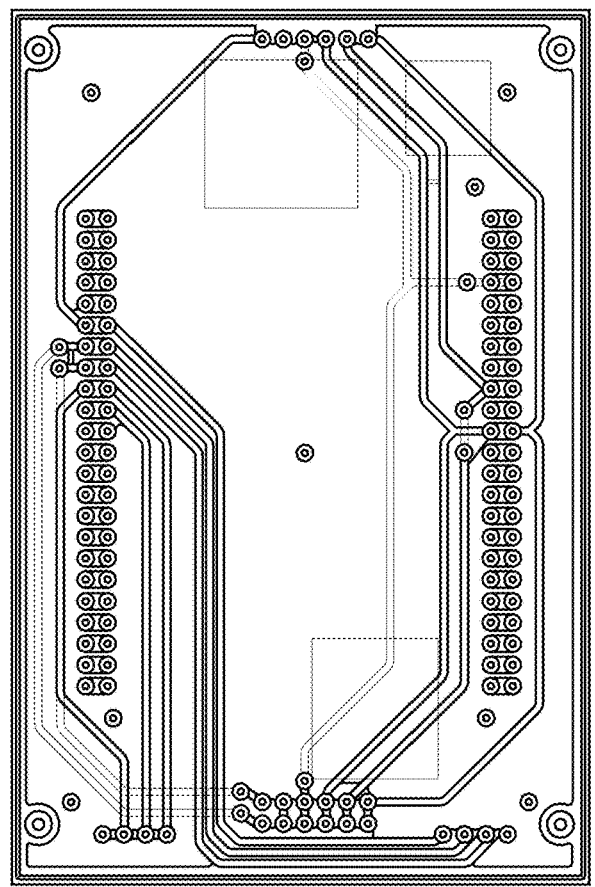
FIGS. 6A-B illustrate a controller, in accordance with an exemplary embodiment of the present invention.
Figure 6B:
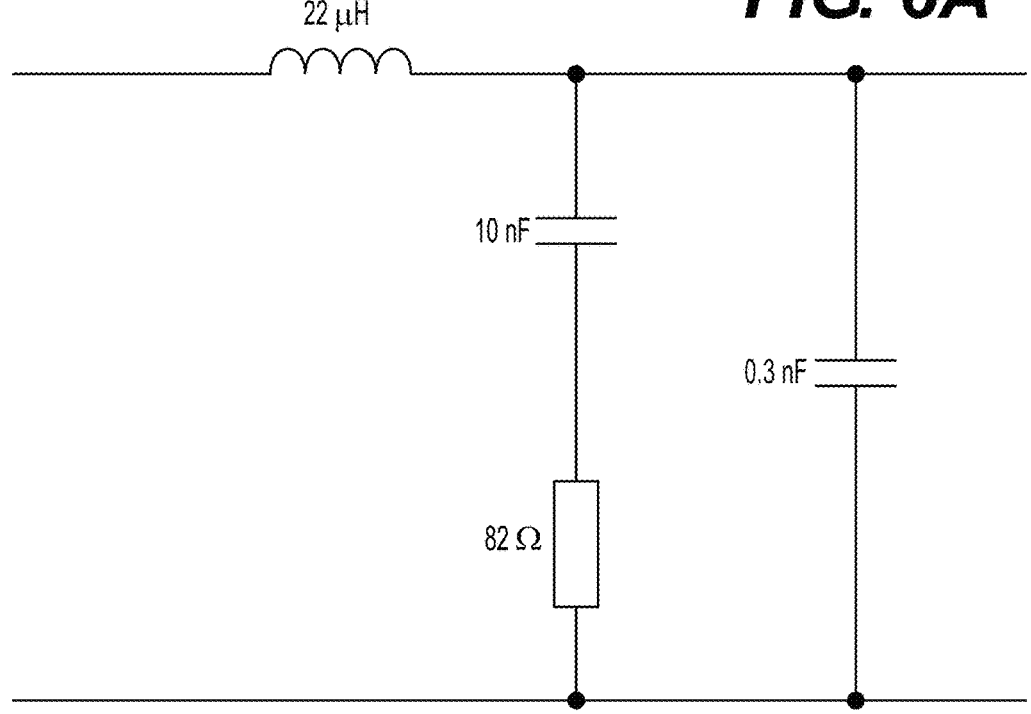

FIG. 3B illustrates an exemplary planetary gear system, which amplifies the torque output of the brushless outrunner motor (e.g., by about six times). The sun gear has 20 teeth, the planets each have 40, and the ring gear has 100. Each planet is evenly spaced and is designed with a 32 degree pitch and a 20 degree pressure angle. The system can be fabricated out of 4140 steel to prevent/reduce teeth wear and, desirably, minimizes the use of material in order to ensure low weight. FIG. 3C shows a pulley designed according to the Table above, with an inner diameter of 0.75 inches and can spool $\frac{1}{8}^{th}$ inch diameter rope.
Controller Case and Cable Housing FIG. 4 provides an illustration of an exemplary electronics and cable housing. Cables are routed through the housing in a cross pattern at an angle to maintain a linear connection between the thigh cuff and shoulder. The guides for the cables allow them to be fixed in a cross pattern across the back. Two Maxon motorboards were placed on the outside surface of the box to allow for maximal air flow, and covers were made for each to reduce visibility of the electronics to the user. A compartment was made for the two 22.2 V battery packs, which allows for easy placement and removal. The electronics housing was attached to the vest through the loops using small poles and pole stoppers.
Mechanical Hardstop The design of the mechanical hardstop is seen in FIG. 5. A u-bolt is secured to the cable while a bolt stopper is tightly secured to a metal plate and the vest by a four point attachment. This mechanical hardstop prevents the motor from injuring the user's back by over-driving the motor when the user lifts. From low-fidelity cable-extension testing with a user, it was found that the cable can be limited to about 16 cm of motion to prevent a harmful over-extensions of the back upon lifting objects. Impact testing was performed to test slippage of the u-bolt mechanism by fixing the hardstop and pulling on a cable with a crane scale for measurements. It was found that the hardstop withstood at least 307 N of force, which is higher than the maximum linear force of 264 N at a commanded current of 5 A.
Controller A custom Beaglebone Black shield was made to interface the Beaglebone Black with the power electronics needed to actuate the device, as shown in FIG. 6A. Each motor is powered by a ESCON Module 50/8 Motor Controller which are each attached to a ESCON Module 50/8 Motherboard. The motherboards contain LPFs and capacitor networks to mitigate current ripple and back-EMF and terminal blocks for batteries and motor signals. 1.8 mF capacitors were added across the power rails of the motherboards to further reduce back-EMF and custom LPF circuits, as shown in FIG. 6B, were added to each motor winding cable to further reduce current ripple. The power electronics are driven by two 24 V battery packs in series, while the Beaglebone Black is powered by a separate 5V battery pack. The boards are modular to ensure that no power driving the motors could be redirected towards the Beaglebone Black and to be able to iterate easily on the design. The Beaglebone Black shield interfaces with the two motherboards through board-to-board connectors which transfer PWM and GPIO signals between them. These connectors carry signals that are only rated for 30 mA. The Beaglebone Black shield has three SPI ports to connect one IMU and two encoders to the Beaglebone Black's SPI bus.

High Level Control

The controller can employ a hierarchical controller comprising a high, mid, and low-level controller. The high-level controller can estimate abstract user-state information, such as the degree of lumbar asymmetry, weight of the object being handled, and intended exertion for lifting/throwing the object. These estimators use multiple sensor modalities including, but not limited to, inertial measurement units (IMUs), rotary encoders, and electromyography (EMG) sensors. Estimation of these user-state variables include analytical, heuristic, and machine learning based algorithms. The following sections provide a series of examples, not intended to be a comprehensive list, of various user-state estimation variables and algorithms.

Degree of Lumbar Asymmetry

Lumbar asymmetry can be defined as the angle by which the trunk deviates from the sagittal plane as defined by the orientation of the pelvis. Conventionally, lumbar spine models include two degrees-of-freedom (DoFs) that can induce asymmetry during manual materials handling (MMH) tasks: lumbar lateral bending (bending in the coronal plane) and lumbar axial rotation (twisting in the transverse plane). Estimating the degree of lumbar asymmetry during MMH tasks can be used to modulate the relative assistance magnitudes in the cables of the exosuit, thus, modulating the magnitude of assistance asymmetry.

The degree of lumbar asymmetry of the user during MMH tasks can be estimated using several methods, in accordance with various embodiments of the invention. A biomechanical model-based approach can be used to reconstruct the orientation of the trunk relative to the pelvis using two IMUs mounted on the trunk and pelvis, respectively. This method typically generalizes well across subjects; however, it can require subject anthropometric data and can be computationally expensive. Another method of lumbar asymmetry estimation can be implemented using simple heuristic thresholds based on IMU orientation. This method is typically computationally cheap but can require tuning each time the exosuit is worn.

An additional approach to estimating lumbar asymmetry includes data-driven algorithms, such as supervised learning regression and classification methods. Regression algorithms, such neural networks and support vector regressors, can be used to estimate continuous, real-valued outputs of lumbar asymmetry. These algorithms present the opportunity for high resolution estimates of lumbar asymmetry; however, they may require more training examples and higher model complexity to achieve similar performance as classifiers. Machine learning classification algorithms use discretized output labels. For instance, lumbar asymmetry can be discretized into left-to-right asymmetric, right-to-left asymmetric, and symmetric lifting. To estimate these labels, an IMU can be used to measure the yaw, pitch, and roll of the user's torso, and EMGs placed on multiple muscles can detect the difference in muscle activation depending on how the user bends over to initiate movement. These inputs to the classifier can be trained by the user performing multiple lifts without assistance or labeled and trained online.

Figure 7:
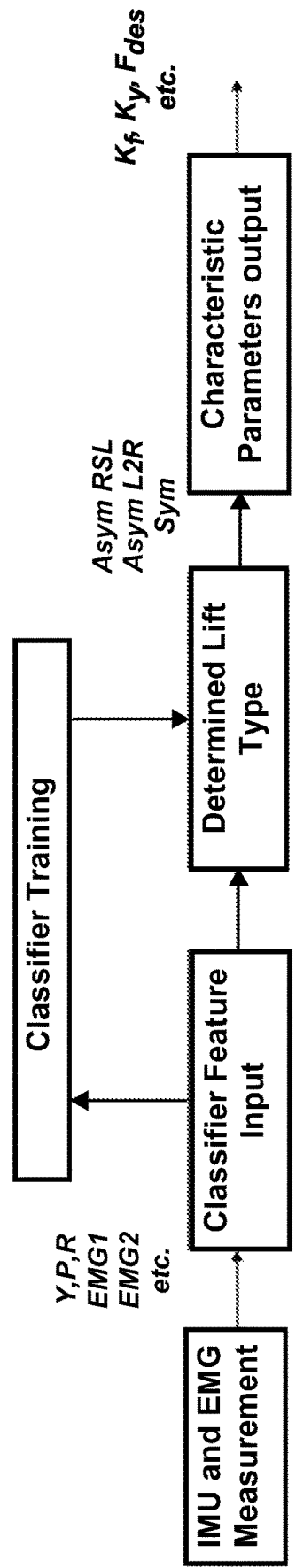
FIG. 7 provides a flow diagram for estimating lift type, in accordance with an exemplary embodiment of the present invention.

Once lumbar asymmetry is determined, the parameters and gains of the mid-level controller can be updated accordingly. After, the lift is completed (as determined by the mid-level controller) the process repeats. An example diagram of this action is shown in FIG. 7.

Object Weight Detection

Given that biological lumbar moment increases with object weight, the assistance magnitude of the exoskeleton can be scaled according to the weight of the object being lifted. Object weight may not be directly measurable during unimpeded exoskeleton operation but can be estimated using similar methods as described above. Object weight detection algorithms can include continuous estimation of the object weight or discretized classification, such as labeling objects into lightweight and heavyweight categories. Estimation metrics for object weight detection can include trunk position, velocity, and acceleration as well as measured muscle activation in trunk extension muscle groups.

Lifting/Throwing Classification

Because some embodiments of the inventive exosuit support system employ inherent geometric flexibility and high-power density actuators, MMH lifting and throwing movements are included in the target domain of device assistance. Though the physical realization of the exoskeleton is capable of assistance during both MMH techniques, it can be important to delineate between them due to their differing biomechanics and assistance requirements. Though similar to the classification algorithms discussed above, lift vs. throw classification algorithms can use a predictive nature to correctly determine the desired assistance profile between MMH tasks. EMG measurements can provide future information given the electromechanical delay between neural activation and contraction of the muscle. Thus, EMG measurements are greatly beneficial for predictive classification algorithms. Additionally, time-series kinematic and inertial information of the user, such as that measured using IMUs, can be used to infer the whether the user intends a lift or throw task. Accurate classification of this user-state variable provides an additional method of shaping the assistance profile and scaling assistance magnitude of the mid-level controller.

Mid-Level Control

Figure 8:
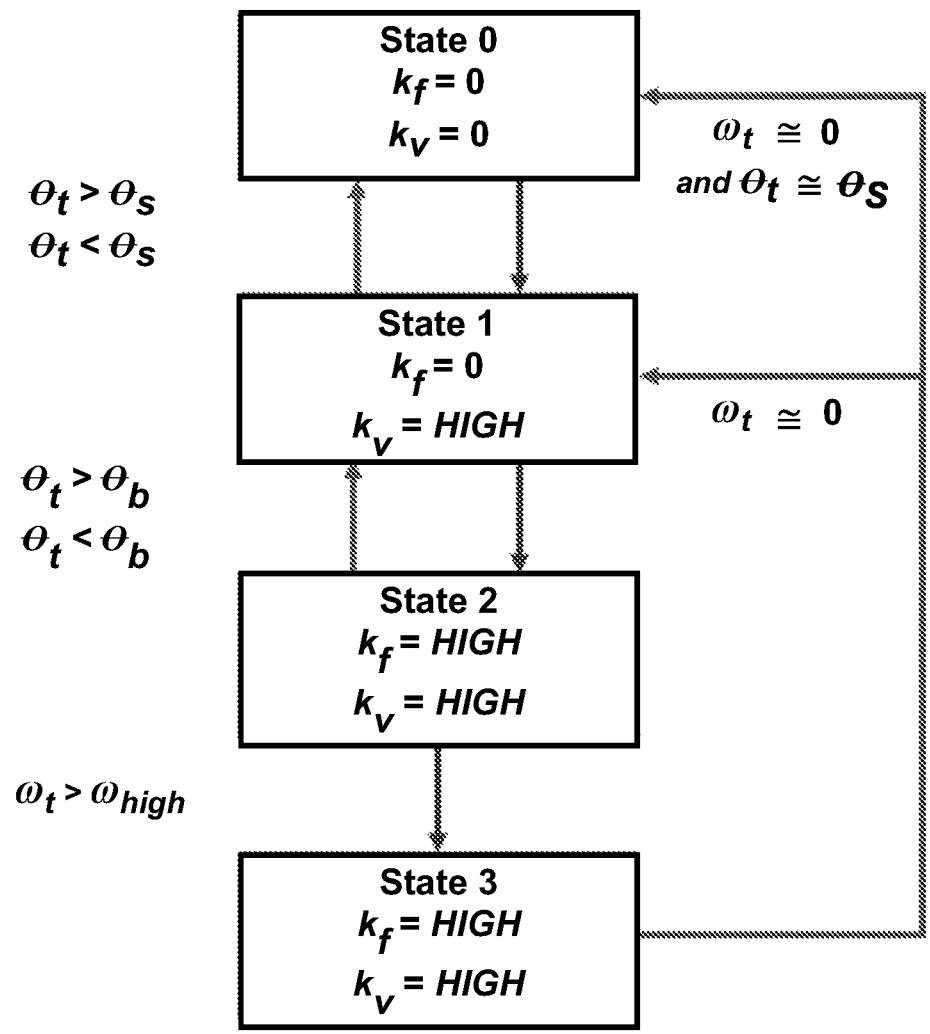
FIG. 8 provides a finite state machine employed on a controller, in accordance with an exemplary embodiment of the present invention.

Using information of user intent from the high-level controller, the mid-level controller can characterize specific parts of the lift using a finite state machine (FSM). And exemplary FSM is shown in FIG. 8.

The gains $k_f$ and $k_v$ are turned to 0, LOW, or HIGH depending on the state of the user during a lifting motion. The parameters $\theta_s$ and $\theta_b$ are defined as the stand angle (the angle at which the user is naturally standing straight) and the bent angle (the angle right before the user is fully bent over). Before experimentation, these values are calibrated to the wearer of the exosuit. During lifting, the measured pitch angle and angular velocity of the user's torso is $\theta_t$ and $\omega_t$ respectively.

State 0 defines when the user is standing straight up. Both control gains are set to zero, turning the motors off. If the user begins bending over ($\theta_t < \theta_s$), the system enters State 1, in which $k_v$ is set to high. This means that $rpm_m$ is dependent upon $v_{torso}$ which acts as a zero-impedance mode: the cables are slacked or spooled up to not hinder the user's bending motion. Once the user bends down sufficiently to reach the object to be lifted ($\theta_t < \theta_b$), State 2 is entered. The cables are pre-tensioned at the desired assistance magnitude while the user prepares to lift the object. The gains are set HIGH in this state to assist as soon as the user begins lifting. If the user crosses the angular velocity threshold, they will enter State 3 where full assistance is applied as the user lifts the object. If the user stops moving and their pitch angle are around the stand angle, the motors are turned off, and the lift motion is finished. As this occurs, assistance is ramped down to reduce unnecessary user strain at the top of the lift. If the pitch angle hasn't been met because the user has stopped moving mid-lift, the system enters State 1.

Biological Torque Assistance Profile

Figure 9:
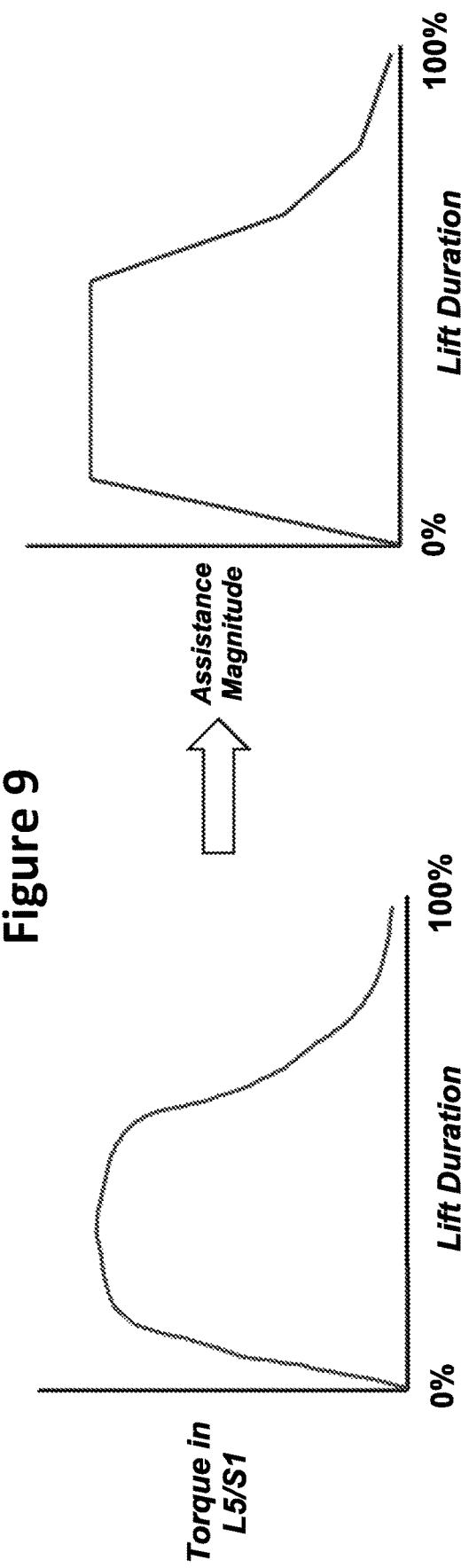
FIG. 9 provides a representation of the biological torque experienced in the L5/S1 joint (shown on left), which is emulated as an assistance profile for an exemplary exosuit (shown in right), in accordance with an exemplary embodiment of the present invention.

Along with assistance timing, the mid-level controller can also handle the magnitude. In assisting the user, applying a single magnitude force throughout the duration of a lift may be sub-optimal. One way to combat this is through use of biological torque profiles of the L5/S1 joint. This profile is generated from the natural torque experienced at the L5/S1 during the duration of a lifting or throwing motion. Assistance magnitude can be derived from this profile, which can be used by the actuators to more naturally apply force when appropriate. Based on the determination of lift/throw type from the high-level controller, the corresponding biological profile can be determined by the mid-level controller. The assistance profile of the lift can follow the equivalent trajectory of the estimated biological torque or can use a simplified trajectory relative to the biological torque as shown in FIG. 9.

Proportional Myoelectric Control

Proportional myoelectric control (PMC) can provide another method for determining the reference torque signal of the mid-level controller. PMC can use measured muscle activation of the back extensor muscles from EMG measurements to determine the desired assistance of the exoskeleton. This method of mid-level control can be useful because it can generate a reference torque control signal with decreased need for detailed user-state information from the high-level controller; however, challenges in PMC arise during user adaptation to the device as their EMG measurements change on long- and short-term timescales. Methods of improving conventional PMC include incorporating adaptive gains for scaling the EMG input to assistance magnitude and pattern recognition systems to include more muscle groups in the estimation of required assistance.

Low-Level Control

Further distilling information from the high and mid-level, the low-level controller can translate received parameters into rpm commands for the actuators.

$$\text{motor output} = k_f(F_{des} - F_{meas}) + k_v(v_{torso}) \quad \text{Equation 1}$$

The control law can be defined by Equation 1, in which the motor output is defined by two parameters: the force in the cables ($F_{des} - F_{meas}$) and the velocity of the torso ($v_{torso}$). The IMU and loadcells are used to measure torso velocity and force applied to the user respectively. The load cell can be placed on the actuator cables in line with the shoulder and the actuator on the thigh, while the IMU is attached to the support vest.

Figure 10:
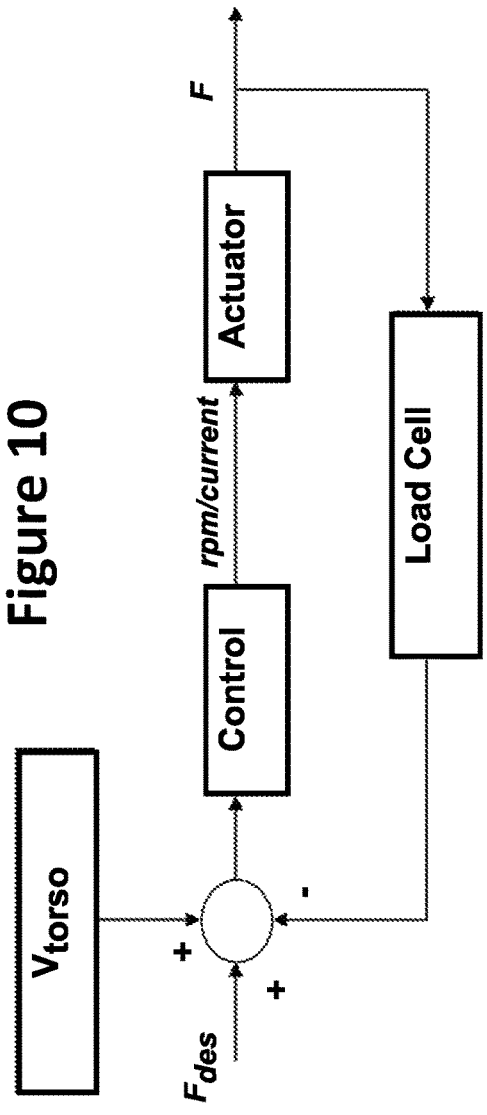
FIG. 10 provides a block diagram of a low-level feedback control loop, in accordance with an exemplary embodiment of the present invention.

The block diagram shown in FIG. 10 provides an exemplary low-level feedback control loop. $F_{des}$ indicates the desired assistance magnitude applied to the user which is characterized by the high-level controller. This value and torso velocity are fed into the control law to dictate either current or rpm commands sent to the actuators. While this occurs, the load cells sense force in the cables and output measured force, or $F_{meas}$. If there is a large difference between desired and measured, rpm or current increases. Once this error decreases, rpm also decreases, which allows the cables to hold constant tension when desired force is reached. Although this is used to control the actuators, it is informed by the mid-level finite state machine (FSM) controllers. This allows the system to differentiate between different states of lifting while enabling more intelligent use of the low-level controller.

The system is also capable of open-loop current control using the following motor parameters:

$$K_{command} = (F_{des} r_{pulley})/(K_T N_{gear})$$

$\tau_{command} = N_{gear} K_T I_{command}$
$N_{gear}$=Gear reduction
$r_{pulley}$=Radius of the pulley
$K_T$=Torque constant of the motor It is to be understood that the embodiments and claims disclosed herein are not limited in their application to the details of construction and arrangement of the components set forth in the description and illustrated in the drawings. Rather, the description and the drawings provide examples of the embodiments envisioned. The embodiments and claims disclosed herein are further capable of other embodiments and of being practiced and carried out in various ways. Also, it is to be understood that the phraseology and terminology employed herein are for the purposes of description and should not be regarded as limiting the claims.

Accordingly, those skilled in the art will appreciate that the conception upon which the application and claims are based may be readily utilized as a basis for the design of other structures, methods, and systems for carrying out the several purposes of the embodiments and claims presented in this application. It is important, therefore, that the claims be regarded as including such equivalent constructions.

Furthermore, the purpose of the foregoing Abstract is to enable the United States Patent and Trademark Office and the public generally, and especially including the practitioners in the art who are not familiar with patent and legal terms or phraseology, to determine quickly from a cursory inspection the nature and essence of the technical disclosure of the application. The Abstract is neither intended to define the claims of the application, nor is it intended to be limiting to the scope of the claims in any way. Instead, it is intended that the invention is defined by the claims appended hereto.

What is claimed is:

1. A flexible-active exosuit support system for applying active assistive force from legs of a user to a torso of the user based upon detected manual materials handling (MMH) tasks of the user comprising:
   a first orthotic interface configured to attach to a first portion of a first leg of the user, the first leg selected from the group consisting of a left leg and a right leg;
   a second orthotic interface configured to attach to a second portion of a second leg of the user being different from the first leg;
   a first shoulder interface positioned proximate a first shoulder of the user being on the same side of the user as the second leg;
   a second shoulder interface positioned proximate a second shoulder of the user being on the same side of the user as the first leg;
   a first member comprising:
      a first end connected to the first orthotic interface; and
      a second end connected to the first shoulder interface;
   a second member comprising:
      a first end connected to the second orthotic interface; and
      a second end connected to the second shoulder interface;
   a first actuator positioned about the first orthotic interface and configured to apply active assistive force based upon a first assistance profile of a classified task from among the MMH tasks from the first leg to the first shoulder via application of a first tension to the first member; and a second actuator positioned about the first orthotic interface and configured to apply active assistive force based upon a second assistance profile of the classified task from the second leg to the second shoulder via application of a second tension to the second member;
wherein the user can perform more than one classified task; and
wherein the system is configured to apply different respective active assistive forces during performance of different respective classified tasks.

2. The exosuit support system of claim 1 further comprising a controller comprising:
a processing platform comprising at least one processor; and
memory comprising instructions that, when executed by the processing platform, cause the controller to:
autonomously determine the classified task being performed by the user; and
based upon, at least in part, the determined classified task, control actuation of the first and second actuators during the performance of the classified task based upon the first and second assistance profiles of the classified task.

3. The exosuit support system of claim 2, wherein the classified task from among the MMH tasks is selected from the group consisting of lifting and throwing; and
wherein the instructions, when executed by the processing platform, further cause the controller to:
detect a magnitude of a load manipulated by the user during the classified task being performed by the user; and
based upon, at least in part, the determined classified task and the magnitude of the load, control actuation of the first and second actuators during the performance of the classified task, which will include varying at least one of the first and second tensions in response to the addition of the detected magnitude.

4. The exosuit support system of claim 3, wherein the instructions, when executed by the processing platform, further cause the controller to:
autonomously determine if a current classified task is being performed by the user that is different from a previously determined classified task that was being performed by the user prior to the current classified task; and
actuate at least one of the first and second actuators to vary at least one of the first and second tensions during a movement by the user.

5. The exosuit support system of claim 4, wherein the instructions, when executed by the processing platform, further cause the controller to;
monitor the movement of the user to determine times to start, change, and stop application of the first and second tensions.

6. The exosuit support system of claim 5 further comprising one or more sensors configured to;
monitor a condition; and
generate an output to the controller indicative of the monitored condition.

7. The exosuit support system of claim 6, wherein at least one of the one or more sensors comprises:
inertial measurement units (IMUs) configured to measure an angular position, velocity, and acceleration of the user's torso; and
electromyography sensors (EMGs) configured to monitor signals from muscles of the user;
wherein the IMUs are mounted on the trunk and pelvis of the user, respectively;
wherein the EMGs are mounted on multiple muscles of the torso of the user; and
wherein the instructions, when executed by the processing platform, further cause the controller to:
determine a degree of lumbar asymmetry of the user during performance of the classified task;
classify the lumbar asymmetry into left-to-right asymmetric, right-to-left asymmetric, and symmetric lifting.

8. The exosuit support system of claim 7, wherein at least one of the one or more sensors comprises an encoder configured to measure a rotation of the first and/or second actuators.

9. The exosuit support system of claim 7, wherein the instructions, when executed by the processing platform, further cause the controller to:
cause the first and second actuators to vary the first and second tensions, respectively, based at least in part on one or more of a predetermined force profile, a biological profile, and a profile based on measured muscle activations from electromyography.

10. The exosuit support system of claim 6, wherein at least two of the one or more sensors comprises:
a sensor configured to monitor a magnitude of the first tension; and
a sensor configured to monitor a magnitude of the second tension;
wherein the instructions, when executed by the processing platform, further cause the controller to:
cause the first actuator to maintain the magnitude of the first tension when the magnitude of the first tension reaches a first level determined by the controller; and
cause the second actuator to maintain the magnitude of the second tension when the magnitude of the second tension reaches a second level determined by the controller.

11. The exosuit support system of claim 5, wherein the instructions, when executed by the processing platform, further cause the controller to:
operate in a zero impedance mode in which the first and second actuators follow the user during movement.

12. The exosuit support system of claim 2 further comprising a power supply configured to supply electrical power to the first actuator, second actuator, and controller.

13. The exosuit support system of claim 1, wherein the first portion of the first leg is a thigh; and
wherein the second portion of the second leg is a right thigh.

14. The exosuit support system of claim 1, wherein the first member further comprises a first cable and the second member further comprises a second cable.

15. The exosuit support system of claim 1, wherein the first actuator comprises a first gear driven pulley and the second actuator comprises a second gear driven pulley.

16. The exosuit support system of claim 1, wherein at least one of the first member and the second member further comprises a mechanical hard stop to cease actuation of at least one of the first and second actuators.

17. A flexible-active exosuit support system for applying active assistive force from a lower portion of a user to an upper portion of the user based upon detected manual materials handling (MMH) tasks being performed by the user, the system comprising:

a crossing set of lines of active assistance including:
   a first line of active assistance from the lower left side of the user to the upper right side of the user; and
   a second line of active assistance from the lower right side of the user to the upper left side of the user; and
a controller comprising:
   a processing platform comprising at least one processor; and
   memory comprising instructions that, when executed by the processing platform, cause the controller to:
      autonomously determine a classified task from among the MMH tasks being performed by the user; and
      based upon, at least in part, the determined classified task, control:
         a first assistance profile for the first line of active assistance during the performance of the classified task; and
         a second assistance profile for the second line of active assistance during the performance of the classified task.

18. The system of claim 17, wherein:
the first line of active assistance comprises:
   a left orthotic interface configured to attach to a portion of a left thigh of the user;
   a right shoulder interface positioned proximate a right shoulder of the user;
   a first member extending from a connection at the left orthotic interface to a connection at the right shoulder interface; and
   a first actuator proximate the left orthotic interface;
the second line of active assistance comprises:
   a right orthotic interface configured to attach to a portion of a right thigh of the user;
   a left shoulder interface positioned proximate a left shoulder of the user;
   a second member extending from a connection at the right orthotic interface to a connection at the left shoulder interface; and
   a second actuator proximate the right orthotic interface;
the first assistance profile includes one or more magnitudes of active assistance, one or more vectors of active assistance, and one or more durations of time of active assistance, that are applied to the first member by the first actuator via direction from the controller;
the second assistance profile includes one or more magnitudes of active assistance, one or more vectors of active assistance, and one or more durations of time of active assistance, that are applied to the second member by the second actuator via direction from the controller; and
the instructions, when executed by the processing platform, further cause the controller to at least one of:
   autonomously determine if a current classified task is being performed by the user that is different from a previously determined classified task that was being performed by the user prior to the current classified task;
   monitor the movement of the user to determine times to start, change, and stop application of the first and second assistance profiles; or
   detect a magnitude of a load manipulated by the user during the classified task being performed by the user.

19. The system of claim 18, wherein the instructions, when executed by the processing platform, further cause the controller to:
   detect a magnitude of a load manipulated by the user during the classified task being performed by the user;
   monitor the movement of the user to determine times to start, change, and stop application of the first and second assistance profiles;
   based upon, at least in part, the determined classified task, the magnitude of the load, and the movement of the user, dynamically control the first and second assistance profiles during performance of the classified task.

* * * * *